United States Patent [19]

Lloyd et al.

[11] 4,455,337

[45] Jun. 19, 1984

[54] PRODUCTION OF NET FROM SYNTHETIC POLYMERIC FILM

[76] Inventors: Ronald Lloyd, 63, Cambridge Rd., Sawbridgeworth, Hertfordshire; Albert G. Patchell, 107, Dawley, Welwyn Garden City, Hertfordshire, both of England

[21] Appl. No.: 248,047

[22] Filed: Mar. 27, 1981

Related U.S. Application Data

[63] Continuation of Ser. No. 923,230, Jul. 10, 1978, abandoned.

[30] Foreign Application Priority Data

Jul. 8, 1977 [GB] United Kingdom ............... 28716/77

[51] Int. Cl.³ ............... B29C 17/02; B29C 24/00; B29D 7/24
[52] U.S. Cl. ............... 428/134; 264/280; 264/290.2; 264/DIG. 47; 264/DIG. 81; 428/135; 428/136; 428/167; 428/169; 428/255; 428/294
[58] Field of Search ............... 156/224; 264/DIG. 81, 264/284, 290.2, DIG. 47; 428/167, 169, 134, 135, 136, 156, 255, 294

[56] References Cited

U.S. PATENT DOCUMENTS

| | | | |
|---|---|---|---|
| 3,575,764 | 4/1971 | McFarren | 156/309 |
| 3,823,267 | 8/1974 | Liu | 428/156 |
| 3,832,256 | 8/1974 | Kalenoites | 156/179 |
| 3,914,365 | 10/1975 | Kim et al. | 264/147 |
| 3,922,329 | 11/1975 | Kim et al. | 264/147 |
| 3,954,933 | 5/1976 | Rasmussen | 264/145 |
| 3,962,508 | 6/1976 | Nakunose | 428/169 |
| 4,075,379 | 2/1978 | Lloyd | 428/105 |
| 4,076,867 | 2/1978 | Lewicki, Jr. et al. | 427/264 |
| 4,133,310 | 1/1979 | Doyd | 128/156 |
| 4,134,951 | 1/1979 | Dow et al. | 264/147 |
| 4,135,021 | 1/1979 | Patchell et al. | 428/134 |
| 4,135,023 | 1/1979 | Doyd | 264/DIG. 47 |

FOREIGN PATENT DOCUMENTS

| | | | |
|---|---|---|---|
| 1530494 | 10/1969 | Fed. Rep. of Germany | 428/156 |
| 980714 | 1/1965 | United Kingdom | 428/156 |

Primary Examiner—James C. Cannon
Attorney, Agent, or Firm—Louis E. Marn; Elliot M. Olstein

[57] ABSTRACT

A film of synthetic polymer is profiled with a pattern of thick and thin areas so that it can split on stretching into a net; additionally the thin areas are likewise profiled so that either the strands of main net split clearly apart or the orifices of main net are covered by an integral fine net arising from the minor profile. Profiles based on the intersection of sets of parallel grooves on opposite surfaces are preferred for both major and minor profiles.

7 Claims, 13 Drawing Figures

PRODUCTION OF NET FROM SYNTHETIC POLYMERIC FILM

This application is a continuation of application Ser. No. 923,230, filed July 10, 1978, and now abandoned.

This invention relates to nets, or net-like structures, of synthetic polymeric material, and to their production. It particulary relates to profiled films of synthetic polymeric material which on stretching in one or more directions yield such nets or net-like structures.

Integral nets are made from synthetic polymeric material made by two main methods. In one a plurality of individual strands is extruded from a rotary or oscillating head and before solidifying contacts another such set of extruded strands, adheres, and forms a net. In the other, to which the present invention is directed, a profiled film of material is stretched, usually in two directions at right angles to open it out by controlled splitting.

The first-mentioned method is not well adapted to the production of fine-mesh nets because of the engineering difficulties of manufacturing and operating the complex movable extrusion heads required. Thus it produces a range of products, all of clean strand character ranging from large mesh e.g. for soil stabilisation on embankments, to intermediate mesh for fencing, agricultural or garden use such as bird netting or plant supports, and smaller mesh e.g. for fruit packaging. The second method however is not adapted to the production of large mesh sizes since mere scaling up of sizes needs a profiled film which can only be produced with difficulty and which in any case does not split cleanly on stretching but leaves large unsplit membranes between the strands. Thus it is used to produce material of small mesh sizes, often with more or less split and fibrillated strands, for medical or hygiene products (such as surgical dressings, or a cover layer for disposable diapers) or for textile uses e.g. as a textile stiffening interliner.

However they are made, nets of synthetic polymer represent a compromise of properties. Mechanical strength of a wide expanse of fine-strand small-orifice net is not high, although the net may have desirable porosity or protection characteristics. On the other hand coarse-strand large-orifice net is strong but often unduly porous. Coarse-strand fine-orifice nets are impracticable for cost reasons. Lamination of fine-orifice to large-orifice nets has been proposed and would produce a composite net of low porosity but improved strength. However, such lamination is technically difficult whether mechanical stitching, or chemical- or heat-bonding, is utilised.

The present invention is based on the discovery of a suitably profiled synthetic polymeric film which can either be stretched to a relatively clean and uniform large-mesh net or can be stretched to an integral net exhibiting thick strands defining large orifices which are filled with thin strands defining small orifices. Within the scope of the invention it will be found that some profiles are more suitable for achieving the first objective and some are more suitable for the second, but it is possible that, depending upon how the film is stretched, the same profile could in some cases be used to achieve either objective.

Before defining in more detail the nature of the present invention, the meaning of the term "profiling" will be explained.

While a net could possibly be produced by stretching a film having a multiplicity of orifices through its thickness, it is usual to provide an un-orificed film in which the orifices are produced only upon stretching, in a regular pattern depending upon the profile of one or both surfaces. Thus, one or both surfaces can be profiled with a pattern of discrete raised embossments so that the relative movement of the embossments when the film is stretched leads to a pattern of splitting in the remaining thinner film portions. Alternatively, a regular pattern of discrete cavities on one or both surfaces can provide sites for splitting. Alternatively again, the provision at one surface of a first set of parallel grooves and at the other surface of a second such set in an intersecting direction, the bases of the grooves of each set being separated by a relatively thin membrane gives a particularly valuable type of overall profile leading to easy stretching.

Such profiling with embossments, cavities or grooves could conceivably be carried out upon a preformed solid polymer film. However, the machinery for this must operate under considerable pressures, and it is therefore much preferred and more practicable to impress the profile onto a molten polymer film whereby it is effectively simultaneously profiled and solidified by cooling. Usually, as described in the prior art, the molten film is extruded from a slit die into the nip between two rollers, one or both of which is profiled and one or both of which is cool enough to solidify the thus-profiled film. This film can be drawn-off the roller and stretched forthwith into net in a single production line, or can be an article of commerce per se.

Suitable absolute and relative dimensioning of profiles, or their combinations, together with the choice of polymer materials and of desired stretching procedures, can produce nets or netted structures with a wide range of properties, e.g. ranging from diaphanous soft fine nets of weight 5–10 gm/m$^2$ for diaper cover layers to visually imperforate heavy surgical strapping tape substrates which are only opened out enough to provide good tear and tensile properties and moisture-vapour permeabilities.

Also before defining in more detail the nature of the present invention, certain characteristics of net types will be explained.

The simplest form of uniform net can be considered as two sets A and B of parallel strands, uniformly spaced at a distance "a" and "b" respectively, set A being at angle $\phi$ to the defined edge of the net (or "machine direction" in the context of the extrusion of film in the present invention) and set B at angle $\theta$. For convenience we can consider four basic types, classified according to the shape of orifice, i.e.:

(1) a=b, $\phi = 90° + \theta$

These have square orifices. Special cases of interest are where $\theta = 0$ i.e. one side of the square lies in the machine direction (case I) and where $\theta = 45°$, where the diagonal is in the machine direction (case II).

(2) a=b, $\phi \neq 90 + \theta$

The orifices are shaped like rhombuses. Special cases are where $\theta = 0$ (one side in the machine direction, case III) or where $\phi = 90°$ (one side at 90° to the machine direction, case IV) or where $\theta = 180 - \phi$ and $\phi - \theta > 90°$ (major diagonal in machine direction, case V).

(3) a$\neq$b, $\phi = 90 + \theta$

The orifices are rectangular. An interesting case is where a b, $\theta = 90$, where the major side is parallel to the machine direction (case VI).

(4) $a \neq b$, $\phi \neq 90 + \theta$

The orifices are parallelograms.

More complex forms of net arise where there are more than two sets of parallel strands A, B, C . . . N, spaced apart a, b, c . . . n respectively, at angles $\theta$, $\phi$, $\rho$ . . . $\omega$ to the machine direction. Exact analysis of the various types depends on the numerical ratios of a, b, c . . . n and whether the various intersections or vertices coincide or differ, but a simple case of interest has three sets of strands A, B, C, where $a=b=c$ and $\theta = 0$, $\phi = 60°$ and $\rho = 120°$, with vertices coinciding. The orifices in this case are equilateral triangles with one side in the machine direction (case VII).

In one aspect the present invention consists in a film profiled to a pattern of thicker and thinner areas whereby it can be stretched to split the thinner areas to form a net or net-like structure; in which film the thinner areas are themselves provided with further profiling of thicker and thinner areas on a smaller scale.

The further profiling may be located at the thin areas of the major profiling only. However, it is preferred for it to extend over part, or even the whole, of the thicker areas. The thicker areas themselves may comprise areas of intermediate thickness over which a portion of the said further profiling extends, as will be described in more detail below.

The major profiling can comprise (i) a regular pattern of discrete raised embodiments or (ii) a regular pattern of discrete depressions or cavities, but preferably comprises (iii) on one surface a set of parallel grooves and on the other a second such set in an intersecting direction, the combined depths of the grooves of the two sets being almost as great as the thickness of the film so as to leave only a membrane where they intersect.

The minor profiling can also comprise any of the features itemised under the headings (i) (ii) or (iii) as listed in the preceding paragraph and formed in the thinner portion of the film e.g. in the said membrane region.

It is however, valuable if both the major and the minor profiling comprises intersecting grooves i.e. the alternative (iii) above. It is especially valuable if the major profiling comprises flat-bottomed grooves in which case minor grooves can run at any angle from zero to 90° in relation to the length of the major grooves. These minor grooves can be any submultiple e.g. from one third to one twentieth of the width of the major grooves but are preferably from one fifth to one tenth of the width of the major grooves. (The major grooves can be from two to twenty grooves per inch in transverse packing). The minor grooves on the different surfaces preferably but not essentially lie in mutually intersecting directions.

The film can comprise a proportion of a blowing agent to assist embossing definition and eventual splitting. It can be formed in polyolefin, such as polypropylene, high density polyethylene, or a polypropylene/high density polyethyle blend or copolymer. Optionally, incompatible polymer blends can be used, for example polyolefins can be blended with polyaromatic compounds such as polystyrene in minor proportions to provide a film which splits very readily. The material of the film can also be polyamide. A preferred maximum thickness of the film is generally related to groove size but is normally considered as being from 100 to 2000 microns.

While the film described above is a primary aspect of the invention, the net produced by stretching such a film also constitutes a feature of the invention.

The net produced by stretching such a film can be considered under two main headings. The first heading produces a large-mesh net corresponding to the major profiling, in which the membranes between the strands are uniformly split up to provide a net of generally uniform mesh size and characteristics. In such a case the minor profiling of the film starting material can either be such as to produce a net on initial stretching or can be such as to merely provide easy splitting into thin parallel bars. (Conversely, profiling can be envisaged which provides parallel major ribs separated by areas of net). Thus it will be seen that the film according to the invention, when stretched, gives a ready splitting and processing characteristic compared to the film not possessing the minor profiling.

It is however of more interest according to the invention to stretch the film as defined above in such a way that it forms a net exhibiting a first pattern of oriented strands defining a plurality of large orifices each covered by a second pattern of intersecting strands defining a plurality of small orifices. Thus this form of net according to the invention is an integral structure having both the strength of the large strands and the resistance to passage of material of the small strands, without any chance of delamination as present in the composite materials in the prior art.

The exact nature of the net according to the invention can vary over a wide range. Thus, having regard to the four classifications of net described above (square, rhombus, rectangle, and parallelogram orifices) it is within the scope of the invention for the larger orifices formed by the major strands to be any one of these four types of orifices and to be filled by minor strands also defining any one of these four types of minor orifices or defining triangles.

More preferably, having regard to the cases defined above as being of particular interest, it is preferred for the major strands and orifices to resemble one of the cases I to VI and the minor strands and minor orifices to resemble one of the cases I to VII.

The degree of strength necessary to produce a net from film as described above is generally within 100% to 2000%, measured in terms of the amount of elongation compared to the original unstretched film. From 300 to 800% is preferred. It will be a matter of normally expected skill for the man in the art not to stretch a net beyond the point where the minor strands break, having regard to its relative dimension and material of manufacture.

While the film and the net as defined above constitute primary objects of the present invention, the invention also extends to a method of producing the film as described above in which a molten sheet of synthetic polymer material is passed between suitable profiling means and simultaneously both profiled in the manner described and solidified. The invention further extends to a method of producing a net in which the film is produced in this way and subsequently passed to stretching means as part of a continuous production line.

Details of melt embossing techniques to produce nets and profiled films are given in our earlier Patent Nos.

The invention will be further described with reference to the accompanying drawings in which:

FIG. 4b shows the result of stretching the portion of film shown in FIG. 4a;

Figure 1A:
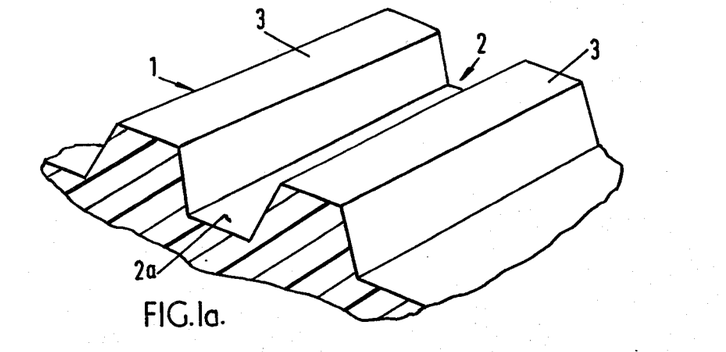
FIGS. 1a to 1d are perspective views of grooves in one surface of a synthetic polymeric film.

FIG. 1a shows one surface of a synthetic polymeric film made of polypropylene (PP) or polyethylene (HDPE) having a major groove 2 therein, each such groove having a flat base 2a and being separated by ribs 3 from a neighbouring like parallel groove.

Figure 1B:
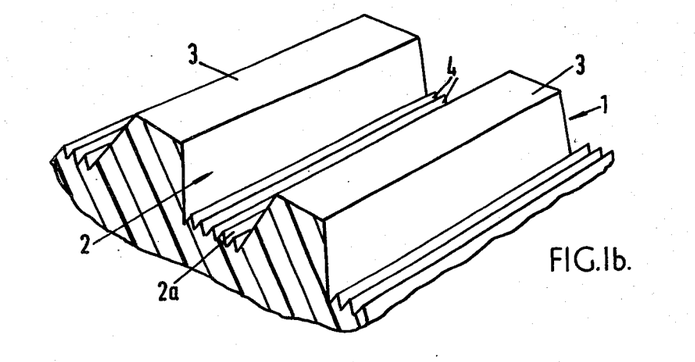

FIG. 1b shows like grooves 2 differing in having minor grooves 4 along the base 2a of the major groove. Typically, as shown, there are five such minor grooves per base portion 2a.

Figures 1C, 1D:
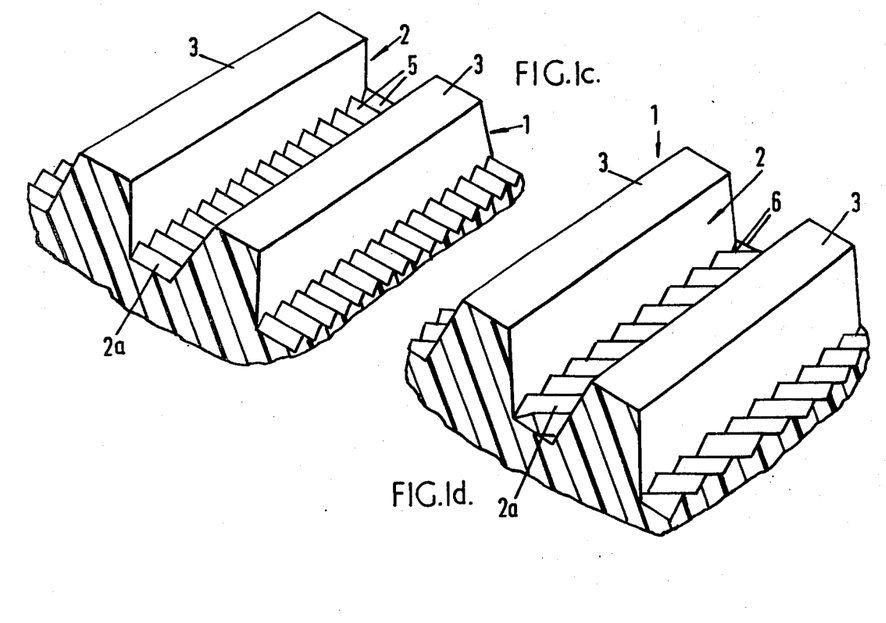

FIG. 1c shows like grooves 2 with transverse minor grooves 5 of the same spacing as those minor grooves 4 shown in FIG. 1b.

FIG. 1d shows like minor grooves 6 angled at 45 to the length of the main groove 2, being otherwise of the same dimensions as the minor grooves in FIGS. 1a and 1b.

Figure 2:
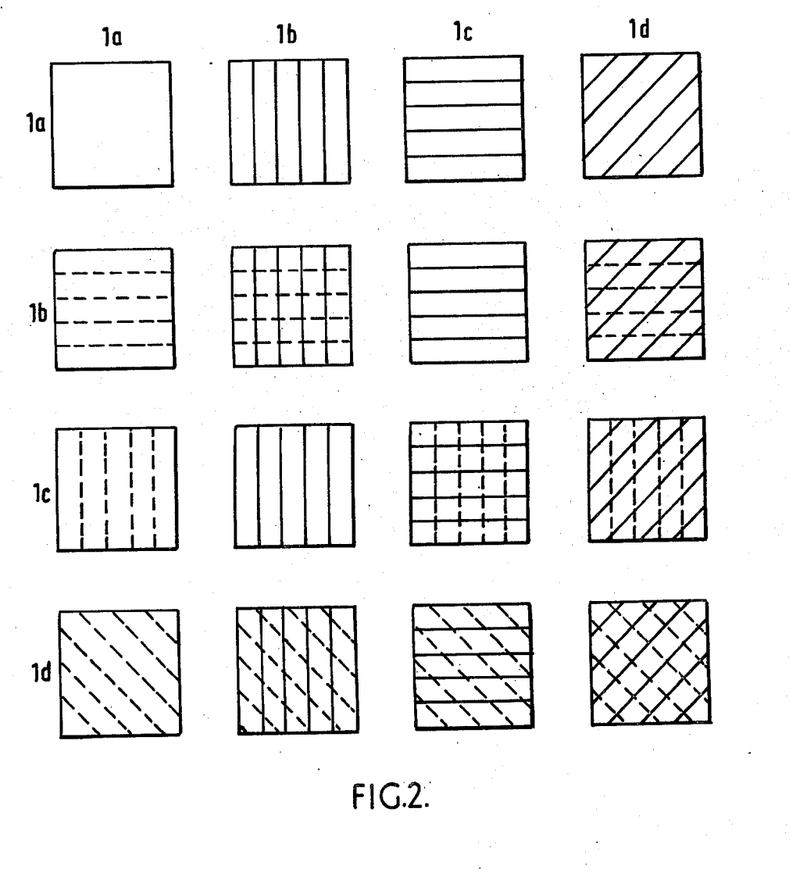
FIG. 2 is a chart showing the effect of combining grooves as shown in the various parts of FIG. 1 in pairs upon different surfaces of the film.

FIG. 2 shows diagrammatically from above the membrane left at the intersection of two major grooves 2 of suitable depth at right angles to one another but on opposite surfaces of the film. The firm line in each case shows the orientation of the upper minor grooves, and the dotted line shows the orientation of the lower minor grooves. (The term orientation in this instance means bearing or angular direction). It will be apparent that the top row of the chart indicates which of the grooves (see FIGS. 1a to 1d) is visible on top, while the side column indicates which of the grooves are hidden underneath.

Assuming that the maching direction is vertical, 1b/1b is case I (as described above), 1c/1c is also case I, 1d/1d is case II, 1d/1b is case IV, 1d/1c is case III, 1c/1d is case IV, and 1b/1d is case III.

Of course the main grooves could have been at different angles to the machine direction, for example both at 45°, thus altering all of the angular directions accordingly. Also, the minor grooves on each face could be different in sizes thus giving the possibility of case VI, or could cross at other than right angles, thus giving the possibility of case V.

Case 1a/1a in the chart is merely a diagrammatic showing of prior art practice.

Those parts of the chart which can be described as 1b/1a, 1c/1a, 1d/1a, 1a/1b, 1c/1b, 1a/1c, 1b/1c, and 1a/1d, while all different in detail in their effect on the major profiling after stretching (see below) are less preferred since they give ribs rather than a net pattern on the membrane.

Figure 3A:
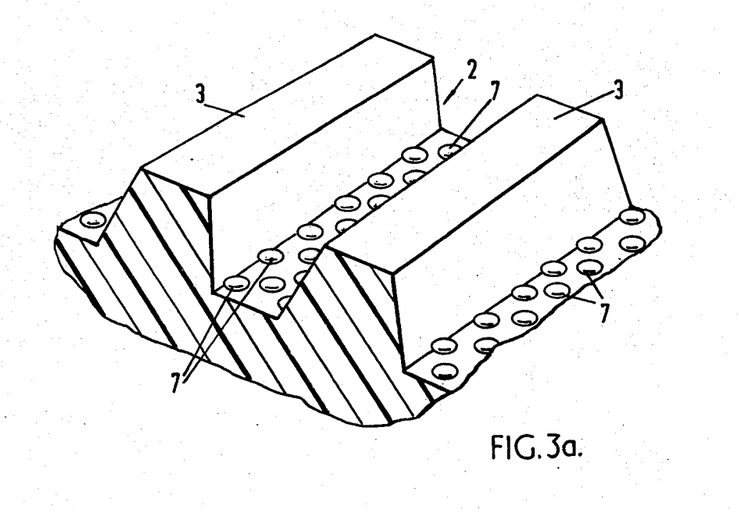
FIGS. 3a and 3b are perspective views, somewhat as in FIGS. 1a to 1d of different types of grooves in one surface of a synthetic polymeric film.
Figure 3B:
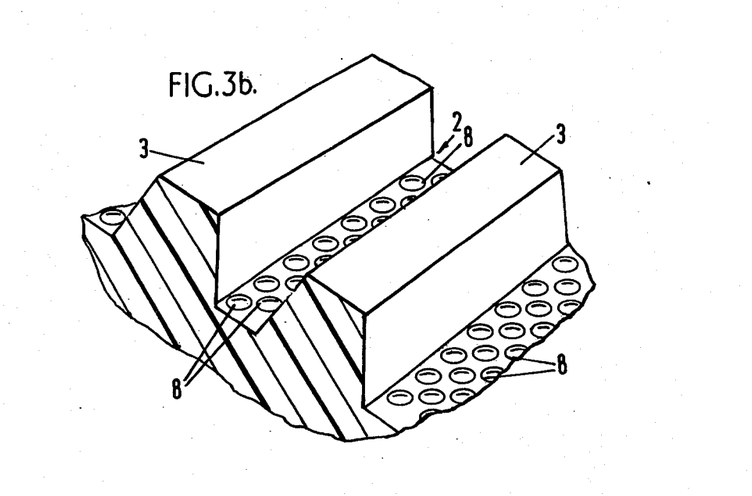

FIG. 3a shows a groove 2 and ribs 3 wherein a pattern of raised embossments 7 is provided on the base of the groove, while in FIG. 3b depressions 8 are provided on the base of the major groove. It is also possible to combine both raised embossments such as 7 and depressions or cavities such as 8 along the base of the same groove.

While it is theoretically possible to include such embossments and cavities on both surfaces of the main grooves 2a or to combine such embossments and cavities with minor grooves as shown in 1b, 1c, or 1d, it is very much preferred to use a plain groove 1a on the other side of the membrane if embossments or cavities are to be provided on the side as shown in FIGS. 3a and 3b. This is because the complexity of pattern of splitting is such as not to give straightforward net structures when the film is stretched but merely to break up the membrane altogether which may be useful as a processing aid but not so useful for producing a novel type of net with two identifiable orifices. Thus, while the information shown diagrammatically in FIG. 2 also relates in general terms to the net produced by stretching such membranes, even a relatively simple case such as 3a/1a or 3b/1a gives a complex pattern which mostly falls within cases I, VI, II, V and especially VII as defined above.

Figure 4A:
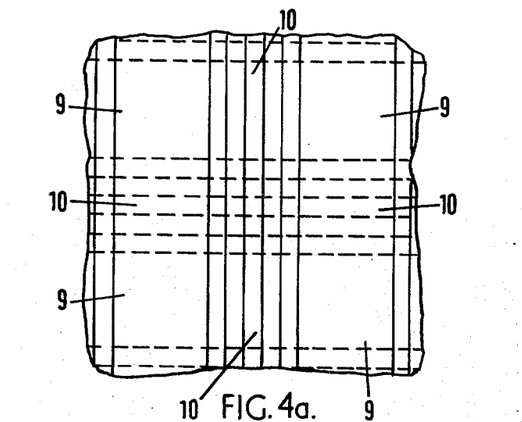
FIG. 4a shows a diagrammatically more detailed view of the environment of one of the examples from the chart of FIG. 2.
Figure 4B:
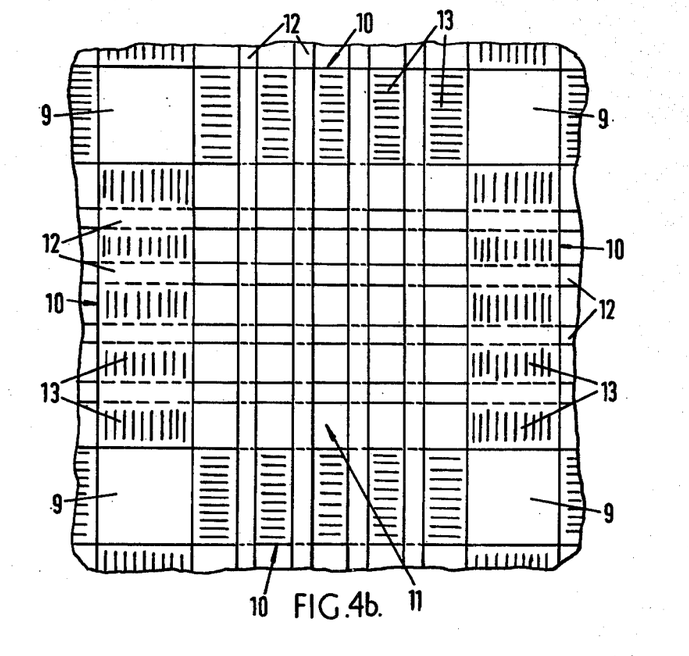
Figure 5A:
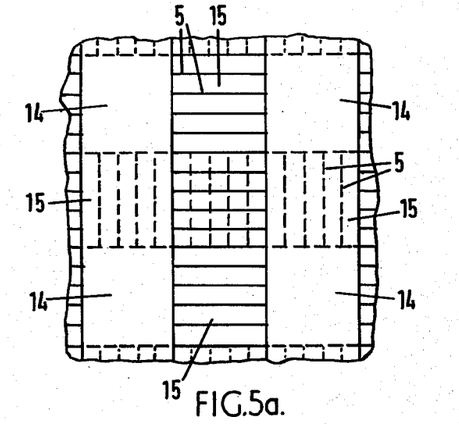
FIGS. 5a and 5b show diagrammatically another example from the chart of FIG. 2 in the same manner as that of FIGS. 4a and 4b.
Figure 5B:
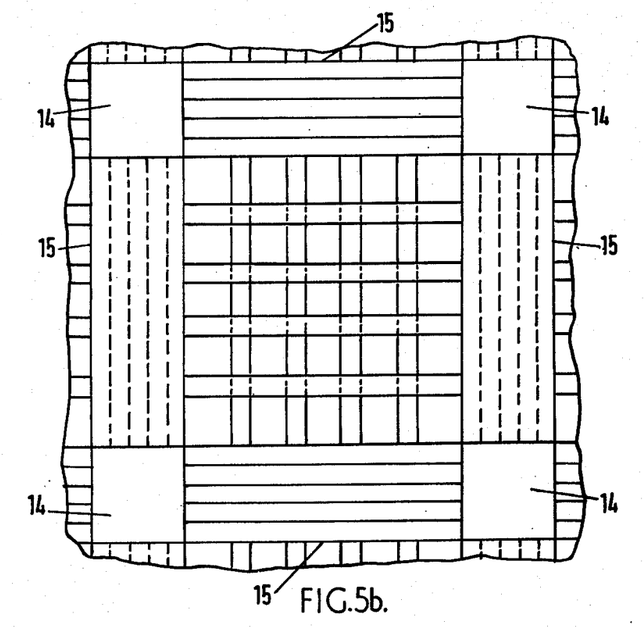
Figure 6A:
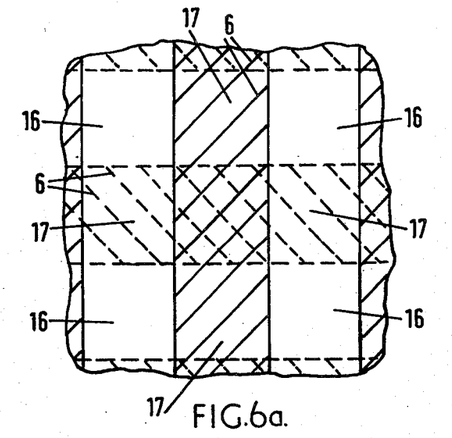
FIGS. 6a and 6b shows yet another example from the chart of FIG. 2 in the manner of those shown in FIGS. 4a and 4b.
Figure 6B:
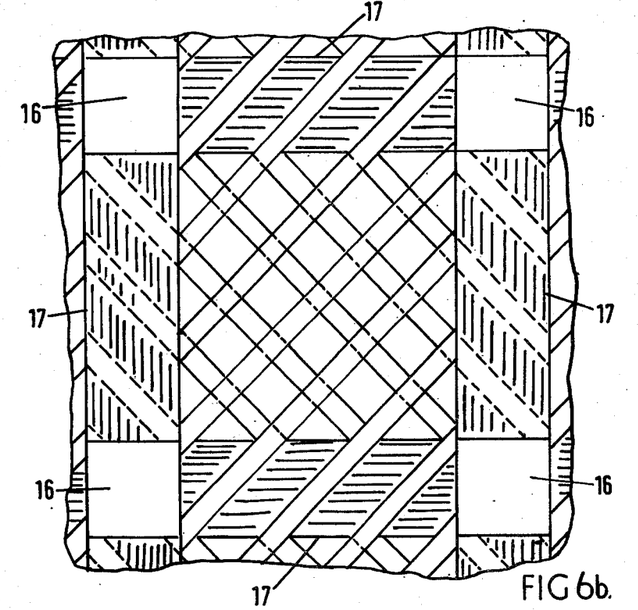

While the effect on the membrane is of primary interest in the present invention whether this involves splitting away of the membrane completely or splitting it to a minor net in a controlled fashion) the effect of different profiling on the major strand of the net produced is also a significant feature and can be understood from a comparison of FIGS. 4 to 6.

FIG. 4a shows a 1b/1b type of pattern on the membrane. Surrounding "bosses" i.e. totally ungrooved regions 9, are thick enough to be unfilibrillated on subsequent stretching, but "strands" 10 are affected by those grooves which pass across them, as shown. On stretching as at 4b there is a fine square net at 11, and stretched strands 10 showing transverse bars 12 with connecting regions 13 which, depending upon the material and the degree of stretch may themselves fibrillate.

Similarly, FIG. 5a shows a 1c/1c type of profiling on the membrane with bosses 14 and strands 15 to which minor grooves 5 are longitudinal. The outcome of stretching, as shown in FIG. 5b is an unfilbrillated smooth stretched strand 15 with residual longitudinal minor grooves.

FIG. 6a shows 1d/1d type of profiling on the membrane, together with bosses 16, strands 17, and minor grooves 6. Stretching gives a clear internal small net but fibrillation and/or angled ribs on the stretched strands 17.

A man skilled in the art will appreciate that FIGS. 4B, 5B and 6B are diagrammatic in nature. This does not markedly affect their utility in describing the invention, but in practice the strands between the bosses become somewhat thinner and neck-in at their central regions. This particularly affects the appearance of the embodiment shown in FIG. 6B, thus fine ribs crossing the strands taking up a much more acute angle with the strands than shown in the drawing.

We claim:

1. An integral net having a first pattern of oriented strands defining a plurality of larger orifices covered by a second pattern of intersecting oriented strands defining a plurality of smaller orifices, said integral net produced by stretching in two directions a film of synthetic polymeric material having a major profiling consisting of a pattern of thicker and thinner areas, said thinner areas being provided with a minor profiling consisting of a pattern of thicker and thinner areas on a scale smaller than that of said major profiling at least one of said major profiling and minor profiling being split to form a net corresponding to said major or minor profiling.

2. The integral net as claimed in claim 1 produced by a degree of stretch in either direction from 100% to 2000%.

3. The integral net as claimed in claim 2 produced by a degree of stretch in either direction from 300% to 800%.

4. An integral net as claimed in claim 1 wherein said orifices are regular in size and shape and are selected from the geometric shapes consisting of a square, rhombuses, rectangles, parallelograms and triangles.

5. The integral net as claimed in claim 4 wherein said orifices are squares and said small orifices are rhombuses or are squares located at an angle to the sides of the net.

6. An integral net as claimed in claim 1 consisting of a larger mesh net corresponding to a major profiling wherein the membranes between the strands of the said larger mesh net are uniformly split to provide a smaller mesh net corresponding to a minor profiling of generally uniform mesh size.

7. An integral net as claimed in claim 1 consisting of parallel major ribs corresponding to a major profiling separated by areas of uniform net corresponding to a minor profiling.

* * * * *

UNITED STATES PATENT AND TRADEMARK OFFICE
CERTIFICATE OF CORRECTION

PATENT NO. : 4,455,337
DATED : JUNE 19, 1984
INVENTOR(S) : RONALD LLOYD & ALBERT G. PATCHELL

It is certified that error appears in the above-identified patent and that said Letters Patent is hereby corrected as shown below: On the title page Insert immediately after item [76] (Inventors) the following information:

--[73] Assignee: Smith & Nephew Plastics Limited, Yorkshire, England --.

Signed and Sealed this

Twelfth Day of February 1985

[SEAL]

Attest:

DONALD J. QUIGG

Attesting Officer

Acting Commissioner of Patents and Trademarks